May 31, 1960 J. E. HANDLER 2,939,139
TRANSMIT-RECEIVE SYSTEMS WITH MEANS FOR ADJUSTING RECEIVER OUTPUT DURING TRANSMISSION TIME
Filed July 14, 1959
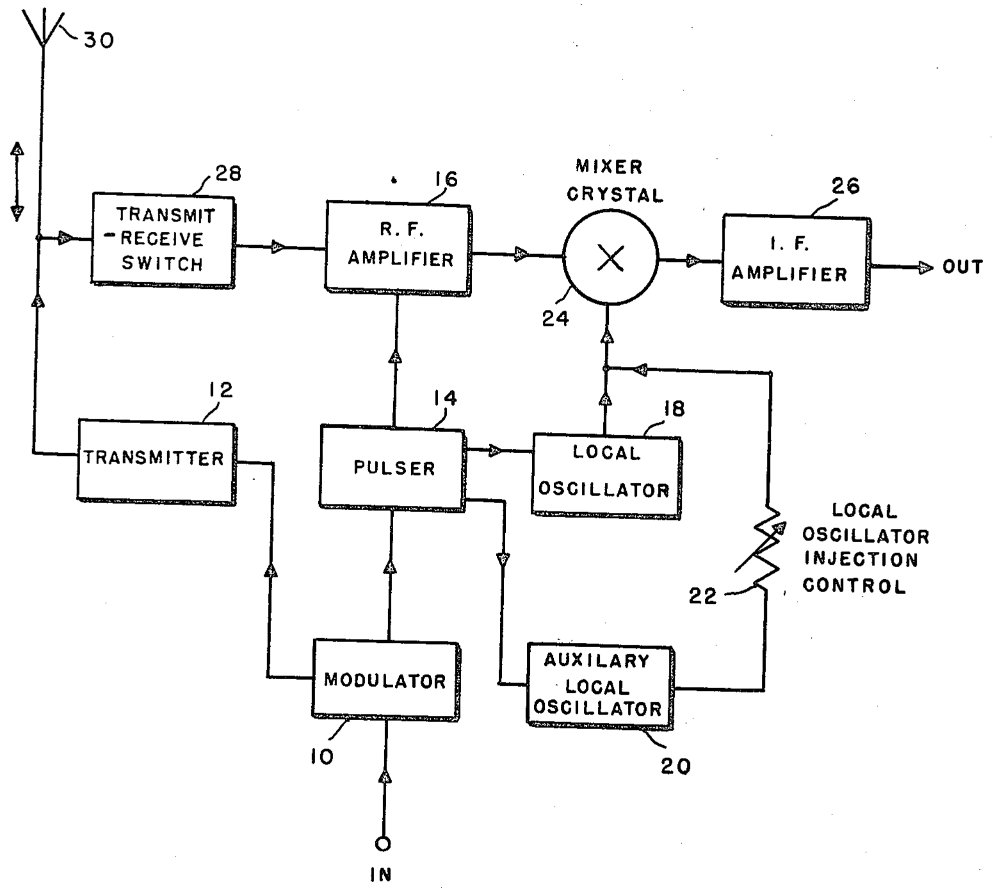
INVENTOR,
JOSEPH E. HANDLER, DECEASED
BY BERNARD HANDLER, ADMINISTRATOR
BY Harry M. Saragovitz
ATTORNEY.

1

2,939,139

TRANSMIT-RECEIVE SYSTEMS WITH MEANS FOR ADJUSTING RECEIVER OUTPUT DURING TRANSMISSION TIME

Joseph E. Handler, deceased, late of Chicago, Ill., by Bernard Handler, administrator, Chicago, Ill., assignor to the United States of America as represented by the Secretary of the Army Filed July 14, 1959, Ser. No. 827,131

5 Claims. (Cl. 343—180)

The present invention relates to radio frequency systems in which a transmitter and receiver are closely operated as when they share a common antenna, e.g., radar systems, and particularly to a means of limiting and controlling the amount of signal leakage from the transmitter through the receiver.

In systems of the type referred to above which use a common antenna, it is conventional to employ cavity type automatic transmit-receive switches (T–R boxes) to isolate the receiver from the antenna during the period when the transmitter is "on" to protect receiver components from overload and to prevent saturation effects which momentarily reduce the sensitivity of the receiver after the transmitter has been turned "off." While cavity type transmit-receive switches are in general quite effective, they have been found to allow excessive leakage at frequencies in the ultra high frequency region and higher.

It is an object of the invention to provide a means of reducing transmitter-receiver leakage which is effective at the high frequencies.

It is a further object of this invention to provide a means of adjusting the leakage so that a reference signal from the transmitter may be fed at a desired level through the receiver. In some cases it is desirable to adjust the leakage equal to received signal amplitude.

In accordance with the invention, means is provided in a receiver to switch the local oscillator signal to a lower level while a transmitter being operated in conjunction with the receiver is "on." One reliable means of accomplishing this is by including in the receiver circuit an auxiliary local oscillator with reduced output, which is keyed "on" as the transmitter is keyed "on." Concurrently, the basic receiver local oscillator is keyed "off." Preferably, the auxiliary oscillator would provide means to adjust its output to meet varying conditions. By reduction of the local oscillator signal to the mixer during "transmit," the mixer output of the transmitter signal is substantially reduced. Further attenuation of the transmitter signal may be accomplished by disabling a receiver radio frequency amplifier stage during the "transmit" period and by means of a conventional transmit-receive switch connecting the input of the receiver to the receiver, or transmitter-receiver antenna.

The features of my invention which I believe to be novel are set forth with particularity in the appended claims. My invention itself, however, both as to its organization and method of operation, together with further objects and advantages thereof, may best be understood by reference to the following description taken in conjunction with the accompanying drawing showing a block diagram of an embodiment of the invention.

Referring to the drawing, modulator 10 to which is applied a keying signal, serves to modulate or key "on" and "off" transmitter 12. Modulator 10 also keys a pulser 14 which in turn applies a disabling or turn "off" pulse to radio frequency amplifier 16 and local oscillator 18, and an enabling, or turn "on," pulse to auxiliary oscillator 20. Variable resistor 22 is representative of

2 an adjustable attenuator by which the output of auxiliary oscillator 20 is adjustably reduced and then furnished to crystal mixer 24. A heterodyne output of mixer 24 is fed to intermediate frequency amplifier 26 and thus to the balance of the receiver which is not shown. Transmit-receive cavity type automatic switch 28 connects radio frequency amplifier 16 to antenna 30 and serves to insert a high impedance between antenna and amplifier during the transmit interval.

During "listen" or "receive" periods, when the transmitter is "off," a signal received by antenna 30 is passed through transmit-receive switch 28 with slight attenuation to radio frequency amplifier 16, in which it is amplified and fed to mixer 24. Receiver local oscillator 18 furnishes a normal reception level conversion signal to mixer 24 which is mixed with the received signal in mixer 24 to produce the desired level of intermediate frequency signal which is fed to intermediate frequency amplifier 26.

When transmitter 12 is keyed "on," transmit-receive switch 28 switches to its "off" or high impedance state; amplifier 16 is disabled limiting the transmitter signal fed through to that provided by the interelectrode capacity of amplifier tube elements; and the local oscillator signal, supplied now by auxiliary oscillator 20, is reduced by adjustment of attenuator 22 to an amount necessary to give the desired mixer output. Amplifier 16 should employ a tube having low input-to-output interelectrode capacity such as the General Electric microminiature ceramic tube 6BY4. Excellent results have been obtained using this tube as a grounded grid amplifier and disabling it by applying a negative pulse from pulser 14 to its anode. The same negative pulse may be used to remove operating anode voltage from local oscillator 18. Similarly, a positive pulse from pulser 14 may be used to furnish an operating anode voltage to oscillator 20.

The following example of insertion losses, or leakage suppression, is representative of what may be expected of the invention as embodied in the circuitry set forth above:

(1) Tranmit-receive (T–R) switch, —30 db
(2) R.F. amplifier, —45 db
(3) Mixer, —10 to —40 db (dependent upon setting of attenuator 22)

As will be noted, the total attenuation may be varied from —85 db to —115 db, thus providing not only an excellent degree of total suppression, but a wide range of suppression adjustment.

While there has been described what is at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a system wherein transmitted and received radio frequency signals are multiplexed in a common antenna and including a transmit-receive switch responsive to said signals and a receiver, said receiver including a local oscillator and a mixer responsive to the output of said local oscillator and the output of said transmit-receive switch; means for controlling the strength of the signal output from said mixer comprising, an auxiliary local oscillator having its output connected as one input to said mixer, switching means for simultaneously rendering said local oscillator inoperative and said auxiliary oscillator operative for the duration of a transmitted signal, and rendering said local oscillator operative and said auxiliary oscillator inoperative for the duration between transmitted signals, said auxiliary oscillator including attenuating means for controlling the amplitude of its output to said mixer.

2. In a pulsed radio frequency system including a transmitter and receiver and wherein the transmitted and received signals are multiplexed in a common antenna by means of a transmit-receive switch responsive to said signals, said receiver comprising a local oscillator and a mixer responsive to the output of said transmit-receive switch; means for controlling the strength of the signal output from said mixer comprising, means for periodically pulsing said transmitter into operation, an auxiliary oscillator having its output in circuit with said mixer, means responsive to said pulsing means for rendering said local oscillator inoperative and rendering said auxiliary oscillator operative for the pulsed duration of said transmitter, said auxiliary oscillator including attenuating means for controlling the amplitude of its output to said mixer.

3. The system in accordance with claim 2 and further including a radio frequency amplifier interconnecting said transmit-receive switch and said mixer, said radio frequency amplifier being responsive to the output of said pulsing means whereby said amplifier and said local oscillator are simultaneously rendered inoperative for the pulsed duration of said transmitter.

4. The system in accordance with claim 3 and wherein the amplitude of the output signal from said auxiliary oscillator is adjusted to a level to provide an amplitude output from said mixer equal to the amplitude of the received signals passed by said mixer.

5. A radio frequency transmission system comprising: a transmitter; a cavity type transmit-receive switch coupled to the output of said transmitter; means for pulsing said transmitter; a receiver, said receiver comprising a radio frequency amplifier connected to the output of said transmit-receive switch, a local oscillator and a mixer connected to the outputs of said amplifier and said local oscillator; and means for controllably reducing the transmitter signal leakage through said mixer, said means comprising an auxiliary local oscillator having its output connected to said mixer, means responsive to said pulsing means for simultaneously rendering said radio frequency amplifier and said local oscillator inoperative and rendering said auxiliary oscillator operative only during the interval when said transmitter is on, said auxiliary oscillator including means for controlling the amplitude of its output to said mixer.

No references cited.